United States Patent
Kludy et al.

(10) Patent No.: US 10,438,006 B2
(45) Date of Patent: Oct. 8, 2019

(54) SECURE INFORMATION STORAGE

(71) Applicant: Citrix Systems, Inc., Fort Lauderdale, FL (US)

(72) Inventors: Thomas M. Kludy, Cooper City, FL (US); Ricardo Fernando Feijoo, Davie, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 15/661,290

(22) Filed: Jul. 27, 2017

(65) Prior Publication Data

US 2019/0034643 A1    Jan. 31, 2019

(51) Int. Cl.
| | |
|---|---|
| *H04L 29/06* | (2006.01) |
| *G06F 21/60* | (2013.01) |
| *G06F 21/62* | (2013.01) |
| *H04L 9/08* | (2006.01) |
| *G06Q 20/00* | (2012.01) |

(52) U.S. Cl.
CPC ........ *G06F 21/602* (2013.01); *G06F 21/6209* (2013.01); *G06Q 20/00* (2013.01); *H04L 9/0825* (2013.01); *H04L 9/0894* (2013.01); *H04L 63/0428* (2013.01); *H04L 63/06* (2013.01); *H04L 63/0823* (2013.01); *H04L 2209/56* (2013.01)

(58) Field of Classification Search
USPC .................................................. 707/10, 827
See application file for complete search history.

(56) References Cited

U.S. PATENT DOCUMENTS

| | | | |
|---|---|---|---|
| 2003/0221097 A1* | 11/2003 | Nakano | G06F 21/10 713/150 |
| 2008/0016352 A1* | 1/2008 | Perlman | G06Q 20/341 713/171 |
| 2008/0133918 A1* | 6/2008 | You | H04L 9/0869 713/175 |
| 2009/0106551 A1* | 4/2009 | Boren | H04L 9/0822 713/158 |
| 2009/0210724 A1* | 8/2009 | Hori | G01C 21/32 713/193 |
| 2010/0325435 A1* | 12/2010 | Park | H04L 9/0844 713/171 |
| 2012/0297189 A1* | 11/2012 | Hayton | H04L 9/0822 713/165 |
| 2014/0006772 A1* | 1/2014 | Qureshi | G06F 21/10 713/150 |

(Continued)

*Primary Examiner* — Maung T Lwin
(74) *Attorney, Agent, or Firm* — Banner & Witcoff, Ltd.

(57) ABSTRACT

Embodiments of the disclosure include systems and methods for secure storage and/or retrieval of customer secrets by, e.g., a cloud services provider. According to methods, secret data that is to be securely stored may be transmitted, along with an initialization vector, to an encryption service for encryption using a private key stored on in a remote key vault. The encrypted data can be returned and stored, in its encrypted form, in a secure storage along with the initialization vector data. To retrieve the securely stored data, embodiments disclose retrieving the encrypted form of the data and transmitting it, along with its related initialization vector data, to the encryption service for decryption using the private key stored in the remote key vault. The decrypted data can then be made available to a requesting product service.

18 Claims, 14 Drawing Sheets

(56) References Cited

U.S. PATENT DOCUMENTS

| | | | | |
|---|---|---|---|---|
| 2014/0108794 A1* | 4/2014 | Barton | ............... | G06F 21/6218 |
| | | | | 713/165 |
| 2014/0164774 A1* | 6/2014 | Nord | ................ | G06F 21/602 |
| | | | | 713/171 |
| 2014/0331060 A1* | 11/2014 | Hayton | ............... | G06F 21/31 |
| | | | | 713/186 |
| 2015/0006890 A1* | 1/2015 | Roth | ............... | G06F 21/6254 |
| | | | | 713/165 |
| 2015/0186657 A1* | 7/2015 | Nakhjiri | ............... | H04L 63/06 |
| | | | | 713/155 |
| 2015/0278553 A1* | 10/2015 | Matsuda | ............... | G09C 1/00 |
| | | | | 713/192 |
| 2015/0341178 A1* | 11/2015 | Tanaka | ............... | H04L 9/0822 |
| | | | | 713/156 |
| 2016/0036793 A1* | 2/2016 | Su | ............... | H04L 9/0825 |
| | | | | 713/171 |
| 2017/0085372 A1* | 3/2017 | Anderson | ............... | H04L 9/08 |

\* cited by examiner

SECURE INFORMATION STORAGE

FIELD

Aspects described herein relate to computer systems and networks. More specifically, aspects described herein generally relate to systems and methods for the secure storage of information, credentials, and other secrets in a per-customer, encrypted, cloud-hosted storage system.

BACKGROUND

Cloud-based computer service providers often store "secret" information (e.g., credentials, proprietary information, personal information, and the like) on behalf of their customers so that the customers can easily access the secret information when using the offerings of the cloud service (e.g., various product services offered by the provider). However, saving the secret information on the cloud service can be a concern to the customers who want to ensure that their information is not readable by other customers, malicious actors, or even by the cloud service provider.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards the secure storage of information and provide improvements in the storage of secret information so that it is accessible by the customer when the customer needs it but is also not accessible by anyone unauthorized by the customer. As described below, embodiments include systems and methods for secure storage that receive a request to securely store data. In response, the data to be stored is transmitted, along with an initialization vector, to an encryption service for encryption using a private key stored on in a remote key vault. The encrypted data can be returned and stored, in its encrypted form, in a secure storage along with the initialization data. In some embodiments, the initialization vector can be generated in response to the received request and may be random or generated by a known algorithm.

According to some embodiments of the disclosure, the data may be encrypted while in transit between the various components of a system using an additional key. For instance, while in transit, the data may be encrypted using a pre-shared key or a public key associated with a customer. Furthermore, the encrypted version of the data may be encrypted using the same or a different additional key when it is in transit from the encryption service, according to some embodiments.

Embodiments of the disclosure also include systems and methods for facilitating the retrieval of securely stored information. According to various methods, a product service requiring use of securely stored data can transmit a request for the data to a data wallet. Upon receipt of the request from the product service, the wallet can retrieve the encrypted data and an associated initialization vector from a secure data store. The encrypted data and the initialization vector can then be transmitted to an encryption service for decryption using a private key stored in a remote storage. The encryption service can decrypt the data using the private key and return the decrypted data. The decrypted data can then be transmitted to the requested product service for its use. According to some embodiments, the decrypted data may be transmitted to the product service via a connector component. Additionally, while in transit between various components, in some embodiments the decrypted data may be temporarily re-encrypted using an additional key associated with the connector component and then decrypted using again at the connector component. Additionally, in some embodiments, the product service may be authenticated by, e.g., the cloud service to verify that the product service has permission to access the encrypted data.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
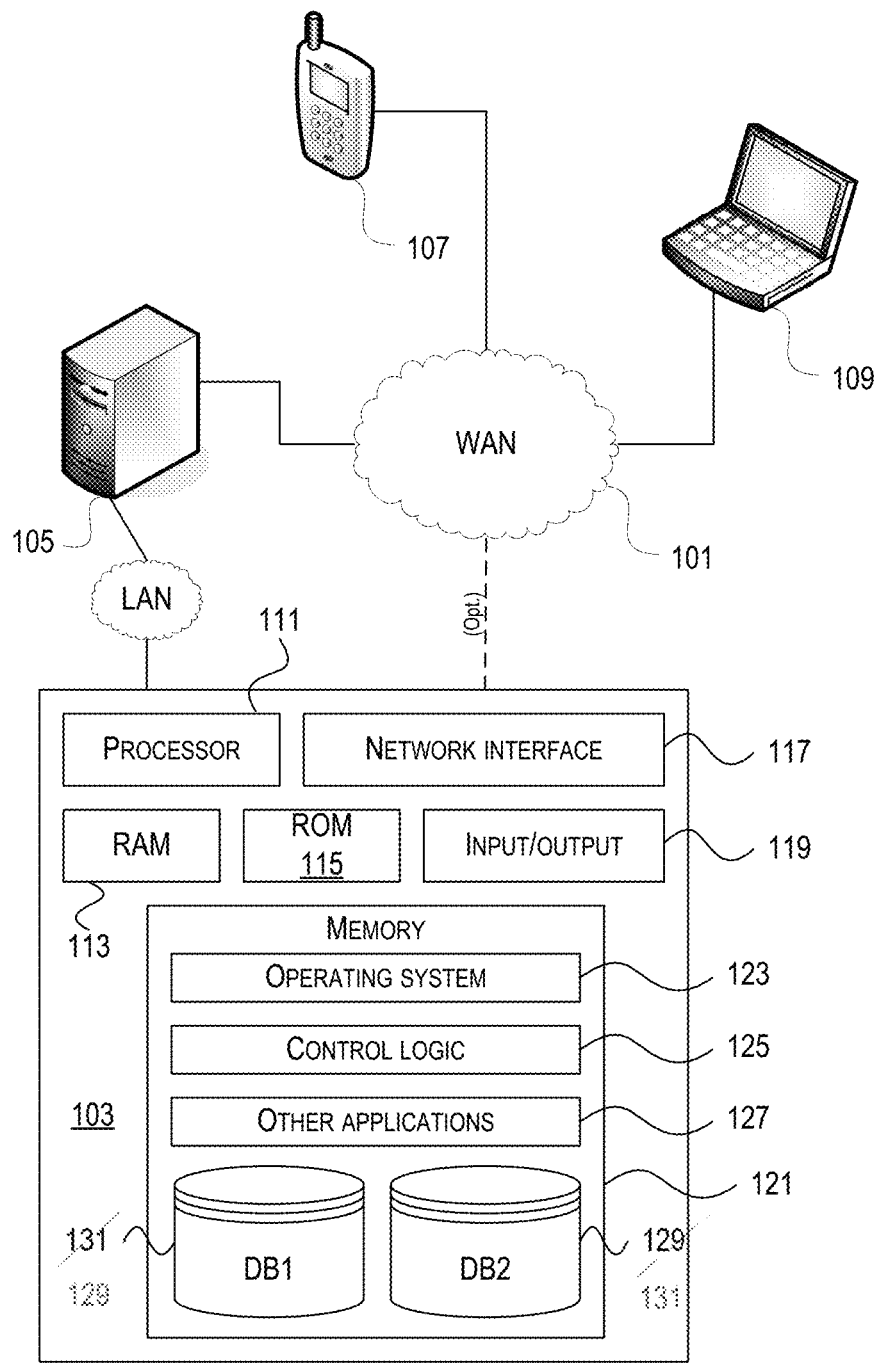
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
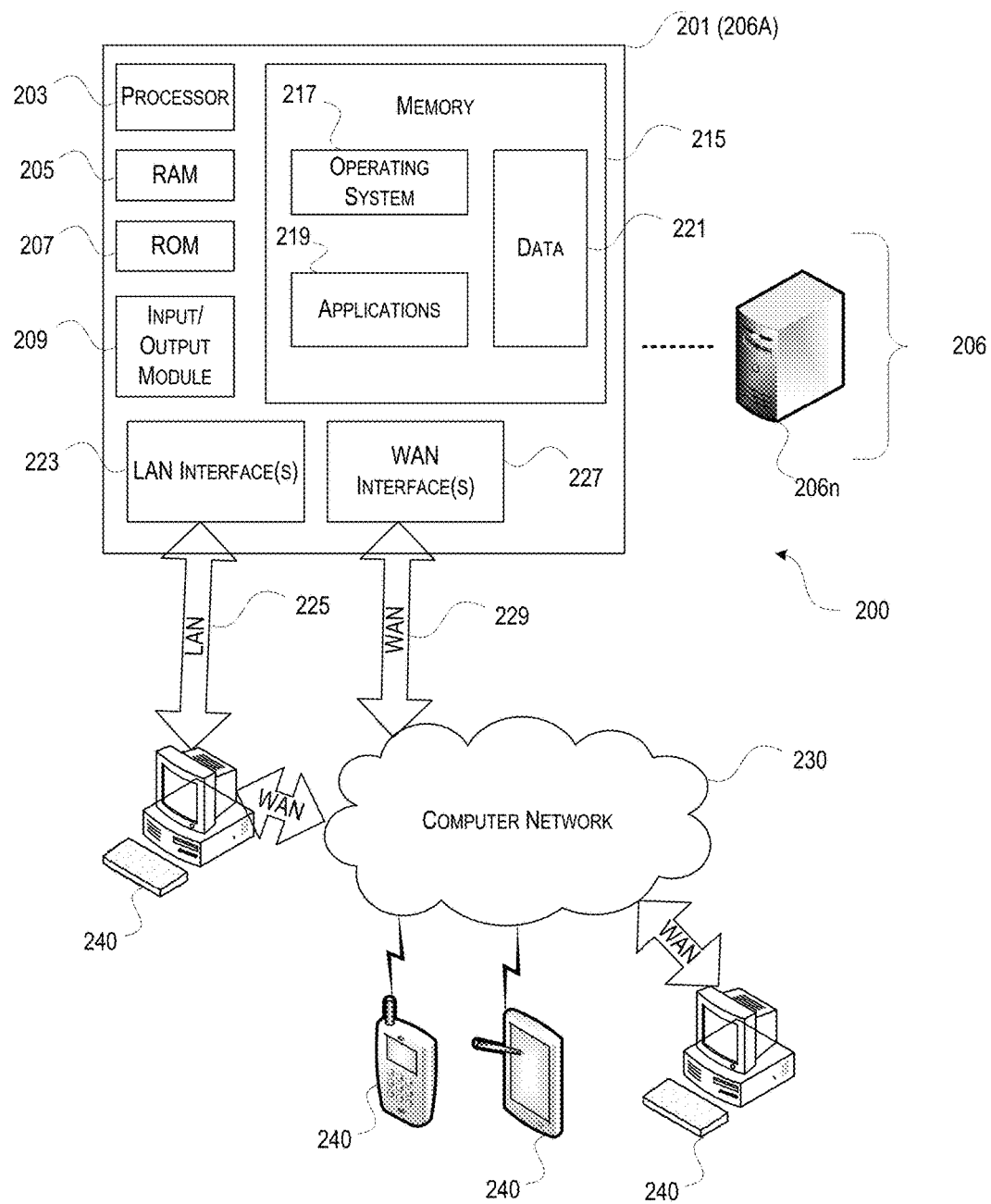
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
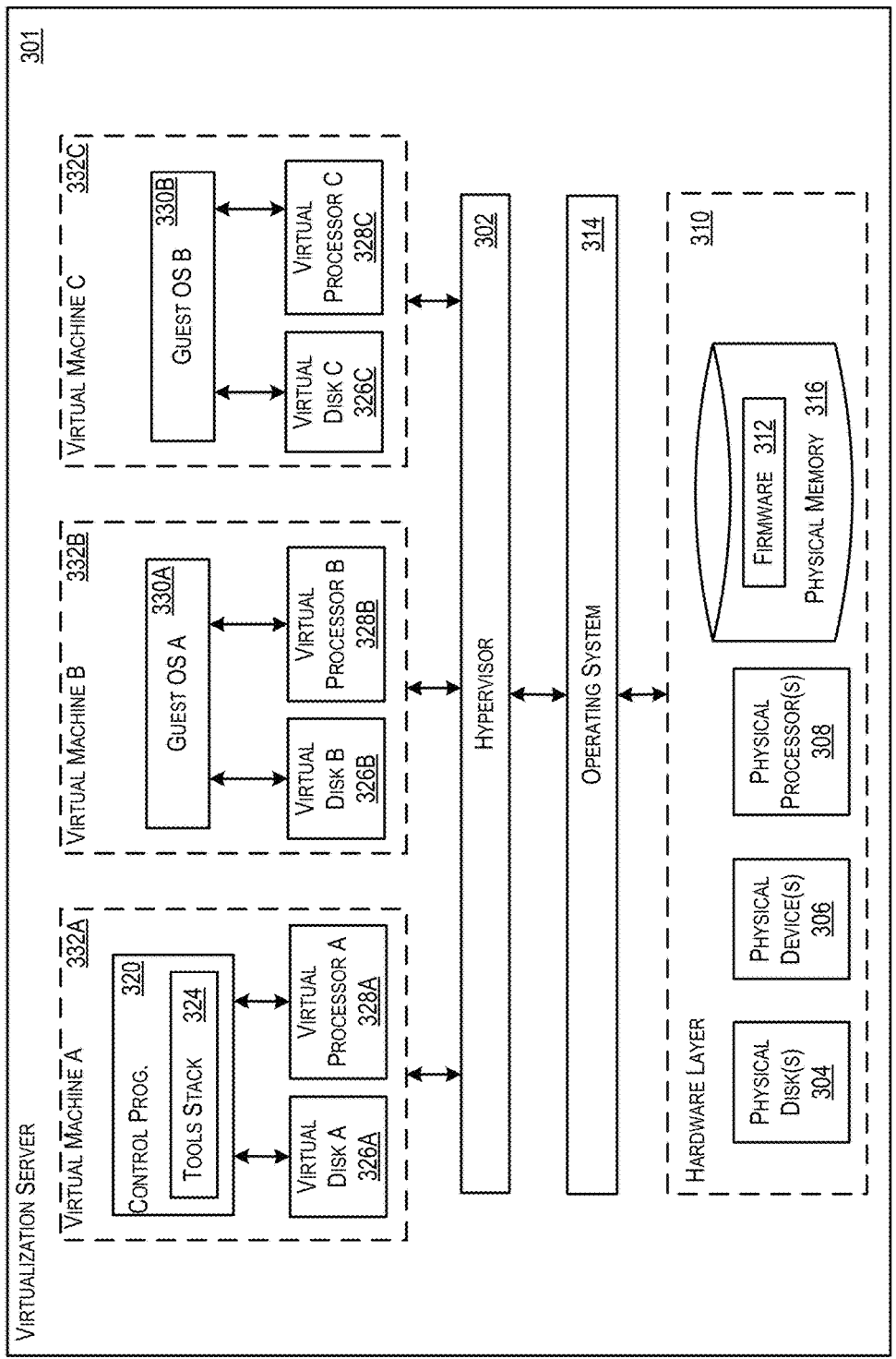
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
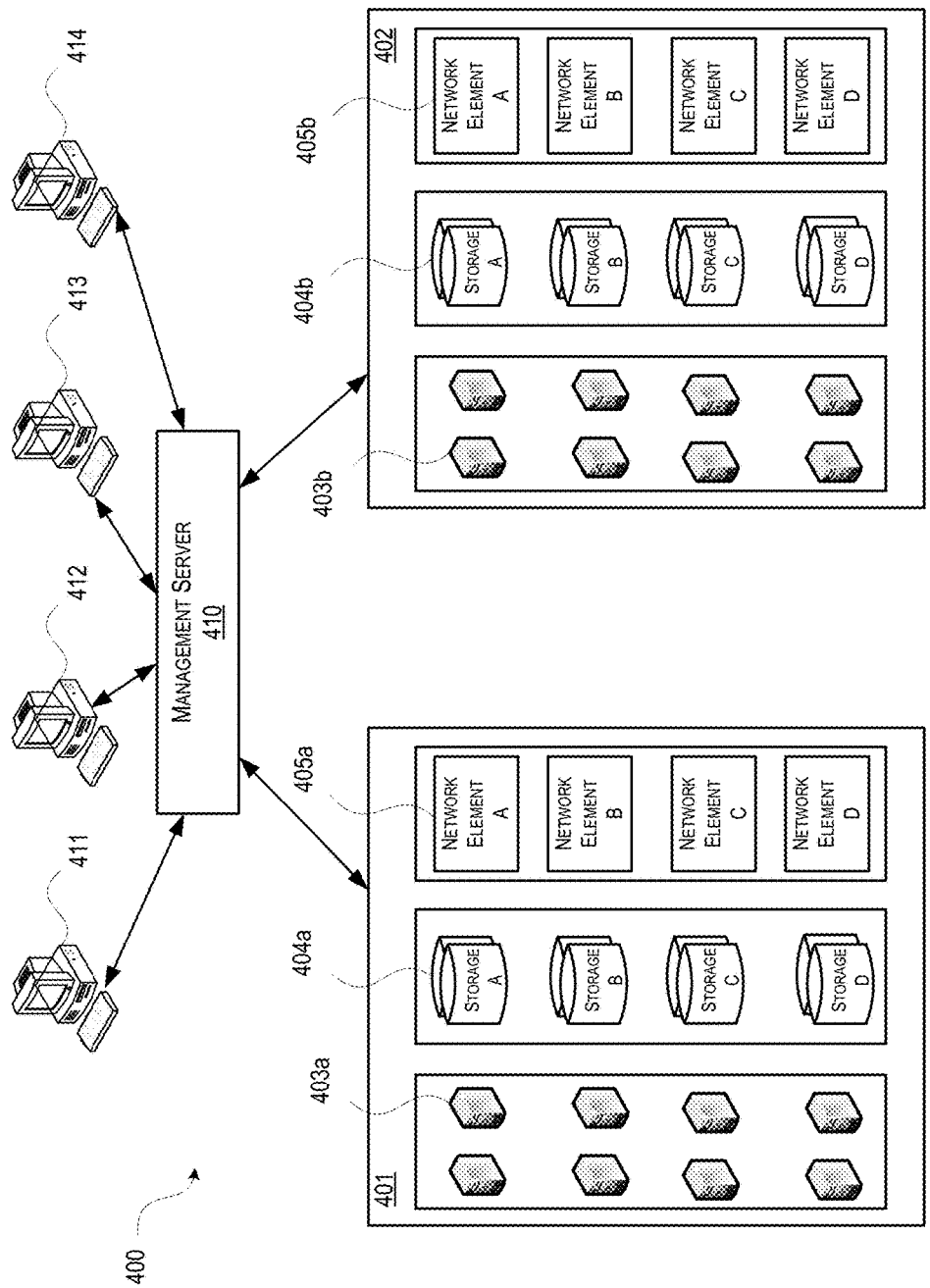
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Secure Information Storage

Figure 5A:
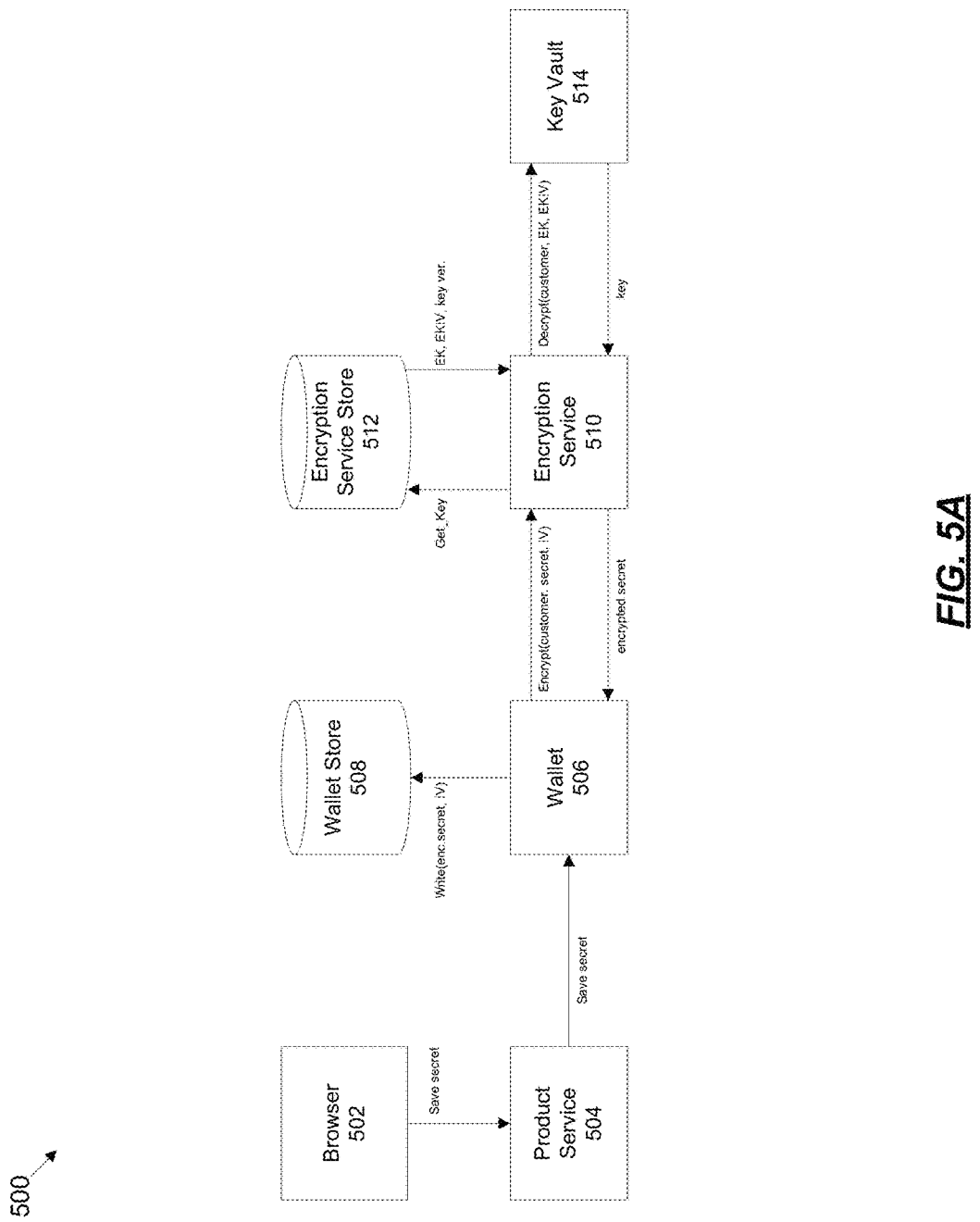
FIG. 5A is a block diagram illustrating a system that stores secret information in accordance with one or more illustrative aspects described herein.

FIG. 5A is a block diagram of a system 500 for saving "secret" information in a secure store according to various aspects. As used herein, "secret" information includes any information that a user and/or customer of a cloud services provider would like to keep in the cloud and prohibit others—including in some instances the cloud services provider—from accessing. For instance, to name a few non-limiting examples, secret information may include passwords, other credentials, proprietary information, personal information, and the like.

As shown in FIG. 5A, the system 500 may include a browser 502 (e.g., a web browser) that communicates with a cloud service such as product service 504. The product service 504 may, in turn communicate with a wallet 506, which communicates with an encryption service 510, and a key vault 514.

According to various embodiments, the browser 502 and/or the product service 504 may operate on one or more users and/or clients of a cloud service provider, such as one or more of clients 411-414. The wallet 506 may comprise one or more computers remote to the clients in some embodiments. For instance, the wallet 506 may be implemented as part of the management server 410 or in one or more availability zones 401 and 402. Similarly the encryption service 510 may be remote to both the wallet 506 and the clients 411-414 running the browser 502 and the product service 504. However, in some embodiments, the encryption service 510 may also be implemented as part of the management server 410 or in one or more availability zones 401 and 402.

The key vault 514 may be remote to the other elements of system 500 according to various embodiments. Indeed, according to some embodiments, key vault 514 may be provided by a third party to the cloud services provider. In general, the key vault may comprise one or more computers capable of safeguarding and management of digital keys and providing protection against tampering and/or evidence of tampering using, e.g., an unalterable audit log, and the like. In some embodiments, the key vault 514 may be implemented using any appropriate hardware security module with the appropriate functionality. Key vault 514 may also have the ability to divide its storage into per-customer partitions. In such a scheme, each customer partition can either be a namespace within a single, multi-tenant key vault (provided by, e.g., the cloud services provider or a third party), or can be a reference/pointer to a customer-provided key vault.

In general, when a service (e.g., product service 504) wants to encrypt a secret on behalf of a customer, the system 500 can use a customer-specific partition of the key vault 514 to decrypt a secondary per-customer key (referred to as the "encrypted key", below). This secondary key can then be used to encrypt the secret and wiped from any memory of, e.g., the encryption service 510. The encrypted secret can then be stored in a cloud storage until it is subsequently needed by the product service 504. FIG. 5A illustrates how this process works.

FIG. 5A shows how exemplary system 500 may be used to securely store a secret so that it is protected at rest, according to various embodiments. To securely store a secret, the browser 502 may initiate the process by indicating to the product service 504 that the secret should be saved. The product service may then send a message to the wallet 506 requesting that the wallet 506 save the secret. In some embodiments, the product service 504 may also send the secret to the wallet in either a temporarily encrypted or un-encrypted state. If encrypted, the secret may be encrypted using a pre-shared key that the wallet 506 can decrypt.

After receiving the request to save the secret from the product service 504, the wallet 506 may decrypt the secret (if necessary) and generate an initialization vector (IV). According to various embodiments, the IV may be used in connection with encryption key to encrypt the secret. The IV may be any arbitrary number and can, according to the various embodiments, be generated using a known algorithm or randomly. Once the secret has been decrypted (if necessary) and the IV generated, the wallet 506 may transmit a request to an encryption service 510 to encrypt the secret. The request may include both the secret and the IV in either a temporarily encrypted form or an un-encrypted form. As with the temporary encryption before, the secret and IV may be encrypted using a pre-shared key. As noted above, the encryption service 510 may be remote to both the wallet 506 and the clients 411-414 running the browser 502 and the product service 504. However, in some embodiments, the encryption service 510 and wallet 506 may be part of the same local system.

When the encryption service 510 receives the request from the wallet 506, it can encrypt the secret and IV (if necessary) and retrieve an encrypted key (EK) from a data store 512 associated with the encryption service. According to various embodiments, the encryption service data store 512 may be any suitable data store remote or local to the encryption service 510. The data store 512 may then return the EK along with an encryption key initialization vector (EKIV) and, in some embodiments, an indication of the version of the key. Upon receiving the EK, EKIV, and (optionally) the key version from the encryption service store 512, the encryption service 510 may request decryption of the key by the key vault 514. According to some embodiments, the request may also specify the customer and the version of the key to the key vault 514.

In response to receiving the request from the encryption service 510, the key vault 514 may transmit the decrypted key to the encryption service 510 for use in encrypting the secret. After encrypting the secret, the encryption service 510 may transmit the encrypted secret to wallet 506 and permanently delete the key received from the key vault 514 from memory. In some embodiments, the deletion of the key may occur upon using the key for encryption. Additionally, in some embodiments, the encryption service 510 may be configured to delete the key after a pre-determined amount of time has passed regardless of whether it has been used to encrypt a secret.

Once the wallet 506 receives the encrypted secret from the encryption service 510, the encrypted secret can be stored in wallet store 508 along with the IV generated earlier. According to various embodiments, the wallet store 508 may comprise data storage located in the cloud and administered by the cloud services provider.

Figure 5B:
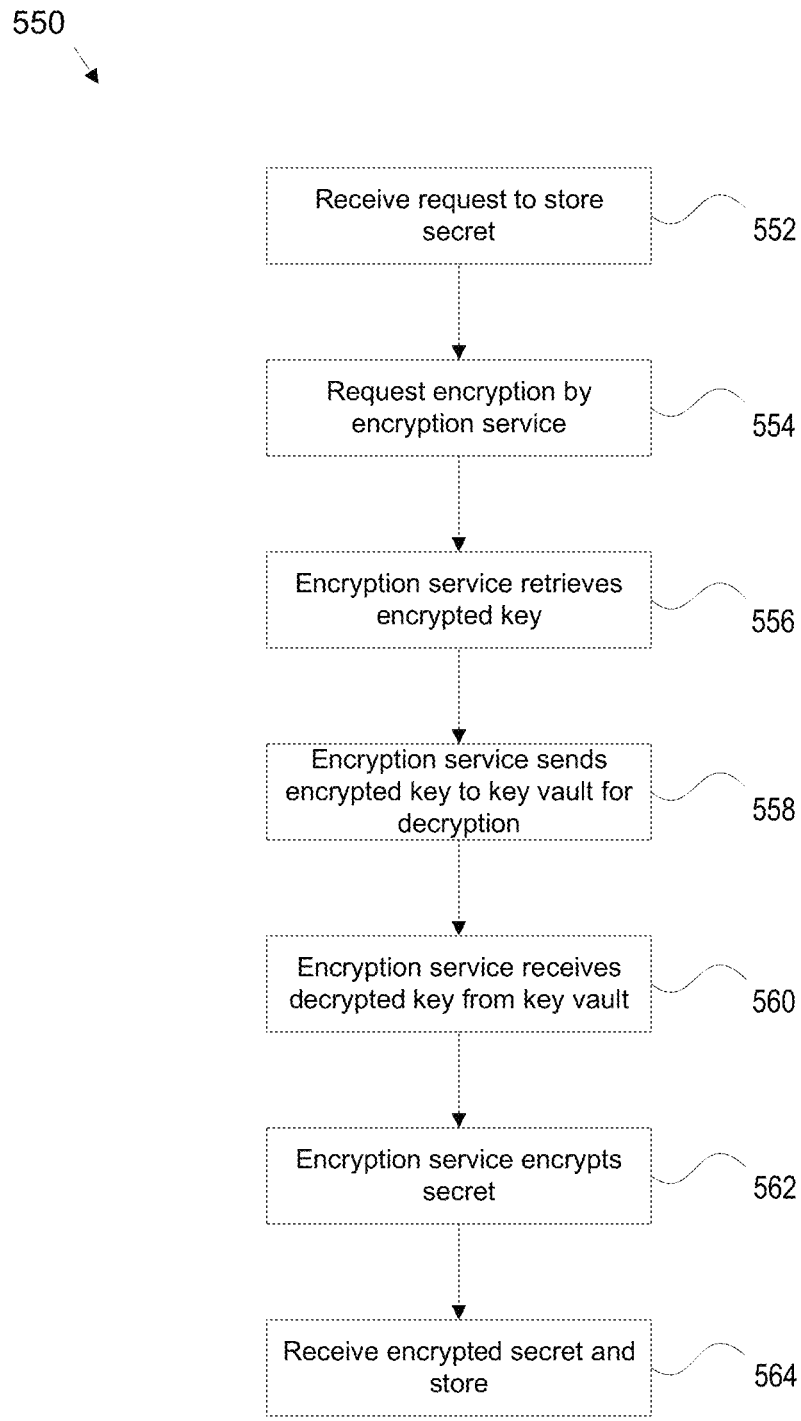
FIG. 5B is a flowchart illustrating a method of storing secret information in accordance with one or more illustrative aspects described herein.

FIG. 5B is a flow chart illustrating a method 550 that may be employed to securely store a secret in cloud storage according to various embodiments. For ease of understanding, method 550 will be described with respect to the system 500 depicted in FIG. 5A. However, method 550 need not be limited to the specific system 500.

As shown in FIG. 5B, the method begins when wallet 506 receives a request to store a secret at 552. As discussed previously, wallet 506 may receive such a request from product service 504, which has, in turn, received instructions to store the secret from browser 502, in some embodiments. The received request may include the secret in a temporarily encrypted form or unencrypted.

In response to receiving the request to store the secret, the wallet 506 may generate an IV and request encryption by an encryption service (e.g., encryption service 510) at 554. The encryption service 510 may retrieve the encrypted key (and associated EKIV) from an encryption service data store (e.g., data store 512) at 556. After retrieving the encrypted key, the encryption service 510 may send a request to a key vault (e.g., key vault 514) for decryption of the encrypted key at 558. In some embodiments, the request from the encryption service 510 to the key vault 514 may also include information identifying a customer and a key version.

Upon receiving the request from the encryption service, the key vault 514 may return the decrypted key to the encryption service 510. The encryption service receives the decrypted key from the key vault at 560 and encrypts the secret at 562 using the decrypted key and the previously-generated IV. At 564, the encryption service returns the encrypted secret to wallet 506 for storage in the wallet store 508.

Figure 6A:
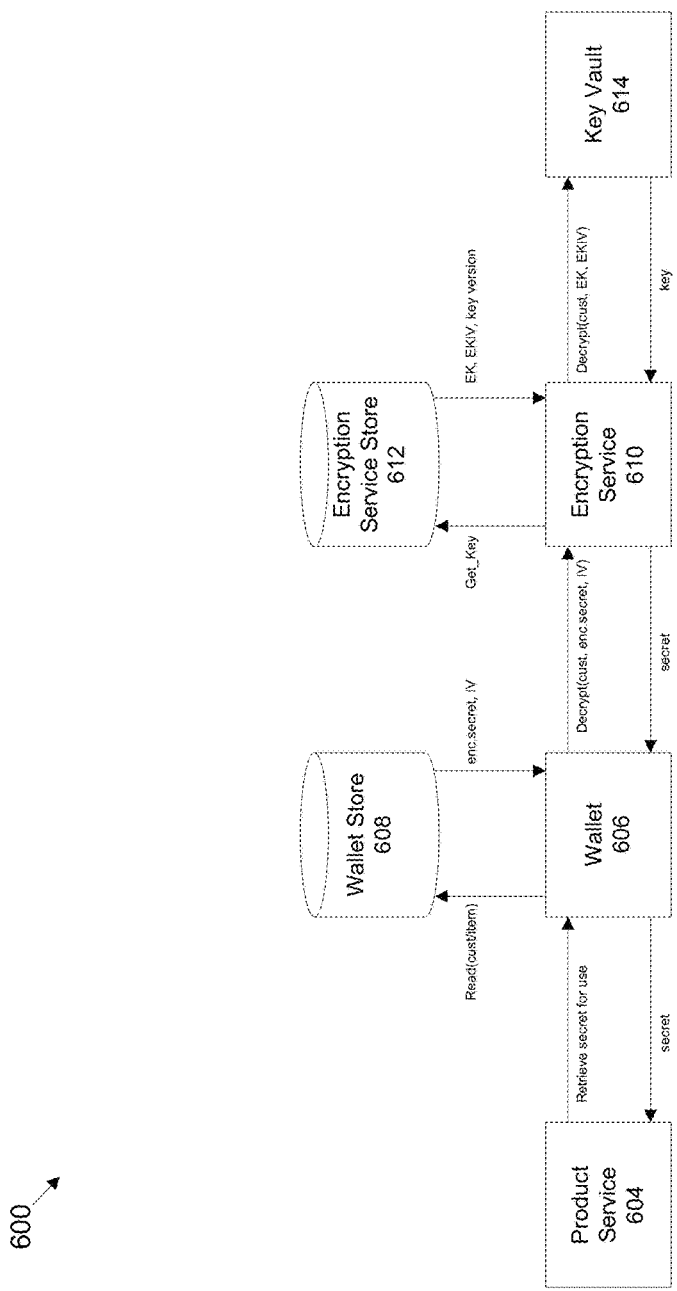
FIG. 6A is a block diagram illustrating a system that retrieves stored secret information in accordance with one or more illustrative aspects described herein.

FIG. 6A is a block diagram of a system 600 for retrieving "secret" information stored in a secure store according to various embodiments. As shown in FIG. 6A, the system 600 may include a browser 602 (e.g., a web browser) that communicates with a cloud service such as product service 604. The product service 604 may, in turn communicate with a wallet 606, which communicates with an encryption service 610, and a key vault 614. Indeed, each of the elements may, in some embodiments, correspond to the elements of system 500.

In general, when a customer wants to decrypt a secret, the cloud service can use the key vault 614 to decrypt a secondary key (e.g., encrypted key EK). The secondary key can be used to decrypt the secret and then wiped from any relevant memory (e.g., the memory of encryption service 610). Once decrypted the secret can be returned to the customer/product service 604. This process is described in more detail with reference to FIG. 6A.

As shown in FIG. 6A, a product service 604 that needs to access a secret may send a message to wallet 606 requesting the secret. The wallet 606 may then send a read request to the associated wallet store 608 for the secret specified by the product service 604. The wallet store 608 can then return the associated encrypted version of the secret along with an associated IV to the wallet 606. Furthermore, according to various embodiments, the information contained in the decryption request may be temporarily encrypted for transmission using a pre-shared key.

After receiving the encrypted secret and associated IV from the wallet store 608, the wallet 606 may then send a decryption request to the encryption service 610. According to various embodiments, the decryption request may include information specifying the customer as well as copies of the encrypted secret and its associated IV.

Upon receipt of the decryption request, the encryption service 610 may (if necessary) decrypt the temporarily encrypted information. Additionally, the encryption service 610 may request a stored encrypted key (EK) from an associated encryption service store 612. In response to the request for the EK, the encryption service store 612 may return the EK and, in some embodiments, also return an encrypted key initialization vector (EKIV) as well as a key version associated with the key to the encryption service 610.

After receiving the EK (and possibly the EKIV and key version) from the encryption service store 612, the encryption service 610 may send a request to the key vault 614 requesting decryption of the EK. The request sent to the key vault 614 may or may not be temporarily encrypted for transmission according to the various embodiments and may include, among other things, information specifying a customer, a version of the key, the EK, and the EKIV.

The key vault 614 may decrypt the EK and return the decrypted key to the encryption service 610. Again, the key may be temporarily encrypted for transmission to the encryption service 610 using a pre-shared key according to various embodiments. When the encryption service 610 receives the key from the key vault 614 it may (if necessary) decrypt the key from its temporary encryption and then use the key to decrypt the secret. According to some embodiments, the encryption service 610 may, upon decrypting the secret, immediately delete the key from its memory. However, in some embodiments, the encryption service 610 may delete the key after a pre-determined amount of time regardless of whether it has actually been used to decrypt a secret. The secret can then be transmitted from the encryption service 610 to the wallet 606, which can itself transmit the secret to the product service 604 for its use. According to some embodiment, the secret can be temporarily encrypted during each stage of its transmission using one or more pre-shared keys to ensure security during transmission.

Figure 6B:
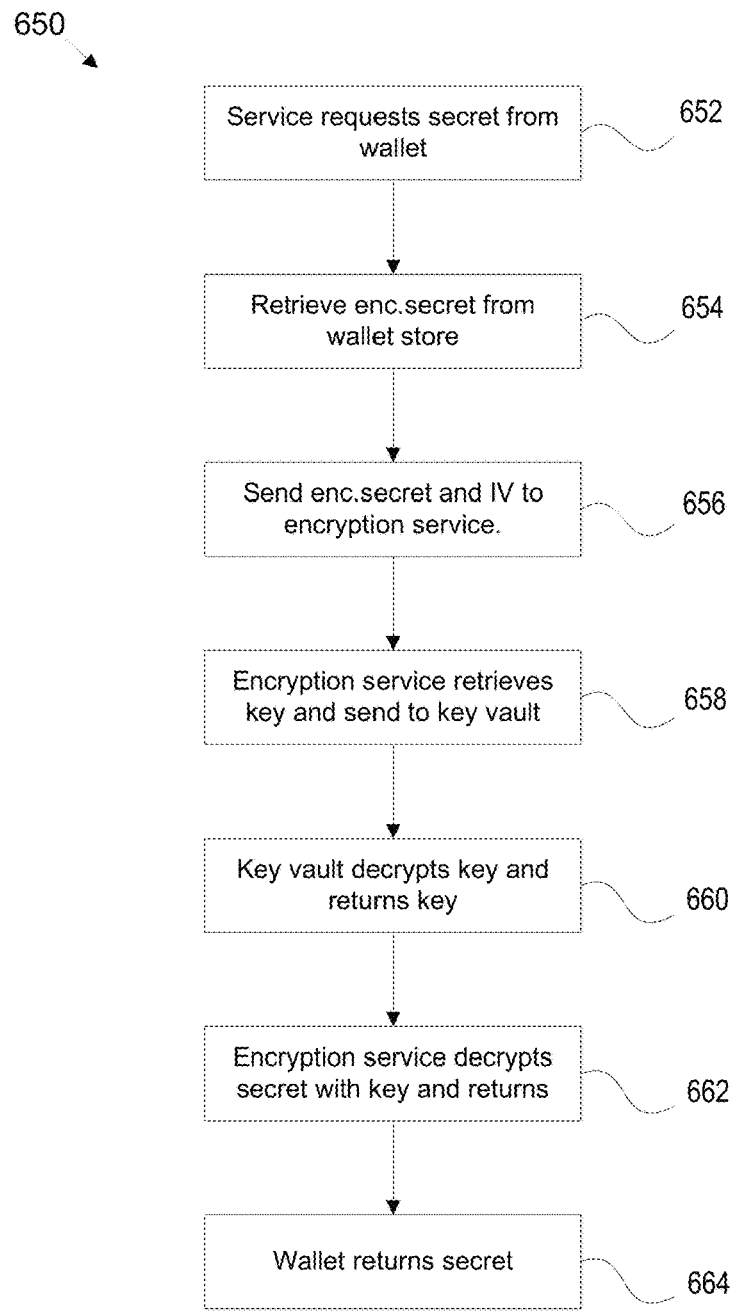
FIG. 6B is a flowchart illustrating a method of retrieving secret information in accordance with one or more illustrative aspects described herein.

FIG. 6B is a flow chart illustrating a method 650 that may be employed to retrieve a securely stored according to various embodiments. For ease of understanding, method 650 will be described with respect to the system 600 depicted in FIG. 6A. However, method 650 need not be limited to the specific system 600.

As shown in FIG. 6B, the method 650 begins with the product service (e.g., product service 604) requesting a secret for its use from a wallet (e.g., wallet 606). This request may take the form of a message and/or may specify further information such as information identifying a specific secret (when multiple secrets are stored for the product service), a temporary key to use when communicating the secret, or customer information, to name a few non-limiting examples.

At 654, the wallet 606, in response to receiving the request for the secret from product service 604, requests the encrypted version of the secret from an associated wallet store (e.g., wallet store 608) where it has been previously stored (using, e.g., the method 550 described above). The wallet store 608 may then return to the wallet 606 the encrypted version of the secret and (in some embodiments) an associated IV.

At 656, the wallet 606 may transmit a request to decrypt the secret an encryption service (e.g., encryption service 610). The request may include, among other things, information identifying the customer, the encrypted secret, and the associated IV. Additionally, in some embodiments, the information contained in the request may be temporarily encrypted for transmission using a pre-shared key.

Upon receiving the request, at 658, the encryption service 610 retrieves an encrypted key (EK) and (in some embodiments) an associated EKIV and key version and sends them to a key vault (e.g., key vault 614) for decryption. At 660, the key vault 614 returns the decrypted key to the encryption service 610. In some embodiments, the key may be temporarily encrypted for transmission rom the key vault 614 to the encryption service 610.

At 662, the encryption service 610 can use the key to decrypt the encrypted secret and transmit the decrypted secret to the wallet 606. Optionally, as discussed above, the encryption service 610 may, upon decrypting the secret, immediately delete the key from its memory. However, in some embodiments, the encryption service 610 may delete the key after a pre-determined amount of time regardless of whether it has actually been used to decrypt a secret. At 664, the wallet may forward the decrypted secret to the product service 604 for its use. In some embodiments, the secret can be temporarily encrypted during its transmission between components of the system 600 using pre-shared keys.

Figure 7A:
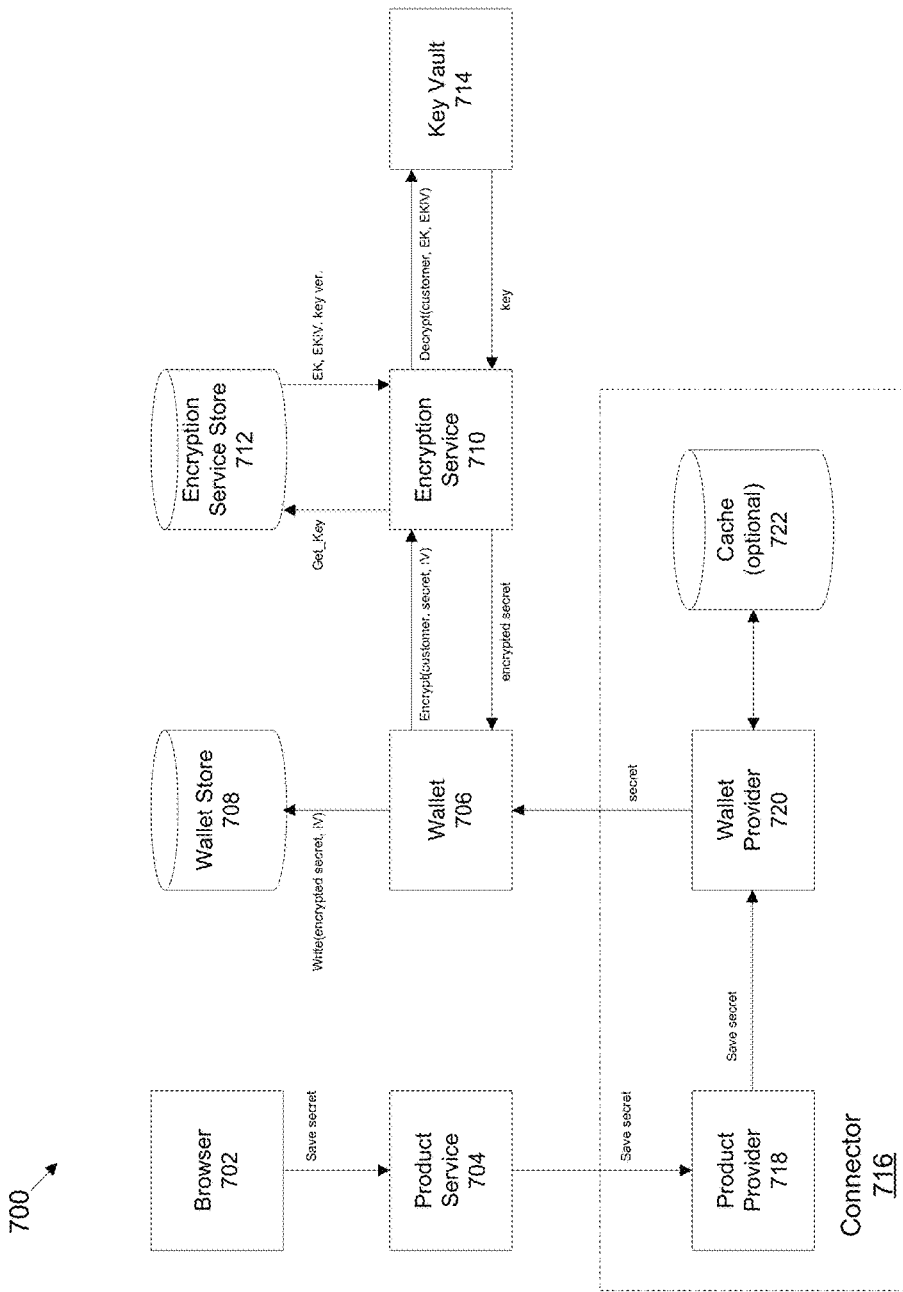
FIG. 7A is a block diagram illustrating a system that stores secret information in accordance with one or more illustrative aspects described herein.

FIG. 7A illustrates an example of a system 700 that may be used to securely store a secret so that it is protected at rest, according to various embodiments. System 700 is similar to systems 500 and 600 described above, except it also includes a connector element 716 that acts as an intermediary between a customer and the cloud services.

The cloud connector 716 may operate as a device or component that is installed at a customer site, but which a cloud services provider can manage. According to various embodiments (and as shown in FIG. 7A), the cloud connector 716 may include a product provider 718 that communicates with product service 704 and with the wallet provider 720. The wallet provider 720 may communicate with the wallet 706. Additionally, the connector 716 may include an optional cache 722 in some embodiments.

Similar to the system 500 described above, to securely store a secret, the browser 702 may initiate the process by indicating to the product service 704 that the secret should be saved. However, in contrast to the process described with respect to system 500, in system 700, the product service 704 transmits the secret to the connector 716 via the product provider 718. The product provider may then forward the secret to the wallet provider 720. In some embodiments, the wallet provider 720 may protect the secret using a password and/or encryption (e.g., using a key stored on the cache 722) prior to sending the secret to wallet 706. In these embodiments, the wallet would never have access to an entirely free and unprotected/unencrypted version of the secret. In embodiments that use the additional password protection, the request from the browser 702 may also include password information that the connector 716 can subsequently use to password protect the secret.

The connector 716 may send the secret (either protected or not depending on the embodiment) to wallet 706. As with system 500, system 700 may the secret to the wallet 706 temporarily encrypted using a pre-shared key. After receiving the secret, the wallet 706 may decrypt the secret (if necessary) and generate an initialization vector (IV). According to various embodiments, the IV may be used in connection with encryption key to encrypt the secret. The IV may be any arbitrary number and can, according to the various embodiments, be generated using a known algorithm or randomly. Once the secret has been decrypted (if necessary) and the IV generated, the wallet 706 may transmit a request to an encryption service 710 to encrypt the secret. The request may include both the secret and the IV in either a temporarily encrypted form or an un-encrypted form.

When the encryption service 710 receives the request from the wallet 706, it can encrypt the secret and IV (if necessary) and retrieve an encrypted key (EK) from a data store 712 associated with the encryption service. According to various embodiments, the encryption service data store 712 may be any suitable data store remote or local to the encryption service 710. The data store 712 may then return the EK along with an encryption key initialization vector (EKIV) and, in some embodiments, an indication of the version of the key. Upon receiving the EK, EKIV, and (optionally) the key version from the encryption service store 712, the encryption service 710 may request decryption of the key by the key vault 714. According to some embodiments, the request may also specify the customer and the version of the key to the key vault 714.

In response to receiving the request from the encryption service 710, the key vault 714 may transmit the decrypted key to the encryption service 710 for use in encrypting the secret. After encrypting the secret, the encryption service 710 may transmit the encrypted secret to wallet 506 and permanently delete the key received from the key vault 714 from memory. In some embodiments, the deletion of the key may occur upon using the key for encryption. Additionally, in some embodiments, the encryption service 710 may be configured to delete the key after a pre-determined amount of time has passed regardless of whether it has been used to encrypt a secret.

Once the wallet 706 receives the encrypted secret from the encryption service 710, the encrypted secret can be stored in wallet store 708 along with the IV generated earlier. According to various embodiments, the wallet store 708 may comprise data storage located in the cloud and administered by the cloud services provider.

Figure 7B:
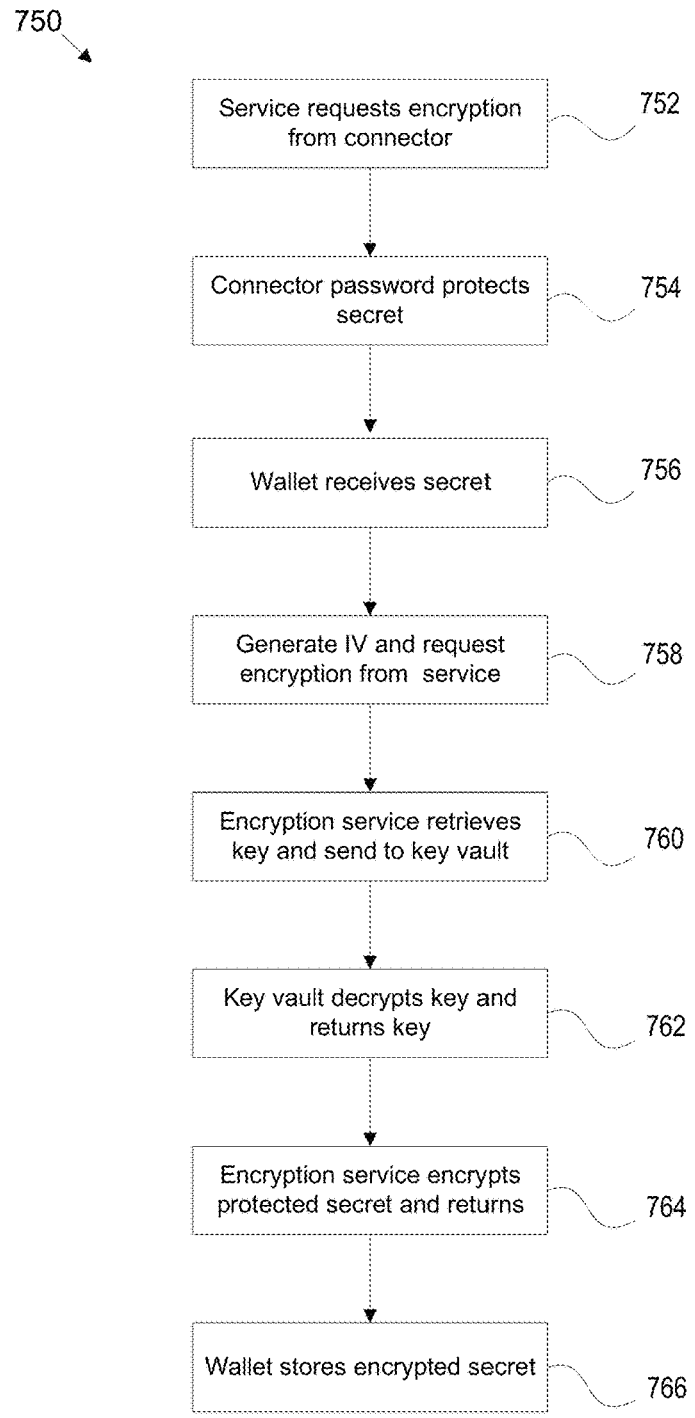
FIG. 7B is a flowchart illustrating a method of storing secret information in accordance with one or more illustrative aspects described herein.

FIG. 7B is a flow chart illustrating a method 750 that may be employed to retrieve a securely stored according to various embodiments. For ease of understanding, method 750 will be described with respect to the system 700 depicted in FIG. 7A. However, method 750 need not be limited to the specific system 700.

As shown, method 750 beings at 752 when a product service (e.g., product service 704) transmits an encryption request to the connector 716. As discussed above, the request itself may originate with the browser 702 and contain, among other things, a secret to be encrypted and a password for use by the connector to protect the secret from access by the cloud. In some embodiments, the request may be received by a product provider 718 of the connector 716 and forwarded to a wallet provider 720.

At 754, the wallet provider may protect the secret using the password and/or encrypt the secret using a key stored in cache 722. Once the connector 716 has protected the secret, the connector 716 may transmit the protected secret to wallet 706, which receives it at 756. After receiving the secret, at 758, the wallet 706 can generate an IV (as discussed above) and transmit a request to an encryption service (e.g., encryption service 710) for encryption of the secret. According to various embodiments, the request for encryption may include information identifying the customer, the secret, and the generated IV. According to some embodiments, some or all of the information contained in the request may be temporarily encrypted for transmission to the encryption service 710 using a pre-shared key. For instance, in some embodiments, only the secret itself is encrypted with the pre-shared key, but in other embodiments all of the information is so encrypted.

At 760, after receiving the request to encrypt the secret from the wallet 706, the encryption service 710 retrieves an encrypted key from an encryption service store (e.g., store 712) and sends the encrypted key to the key vault (e.g., key vault 714) for decryption. According to various embodiments, along with the encrypted key, the encryption service 710 may also send an EKIV and information pertaining to the customer and key version.

At 762, the key vault 714 decrypts the key and returns it to encryption service 710. In some embodiments, the key vault 714 may transmit the decrypted key in a temporarily encrypted form using a pre-shared key. At 764 the encryption service 710 can encrypt the protected secret and return the encrypted and protected secret to the wallet 706. Once it receives the encrypted secret, the wallet 706 can store the encrypted secret in an associated wallet store (e.g., store 708) at 766.

Figure 8A:
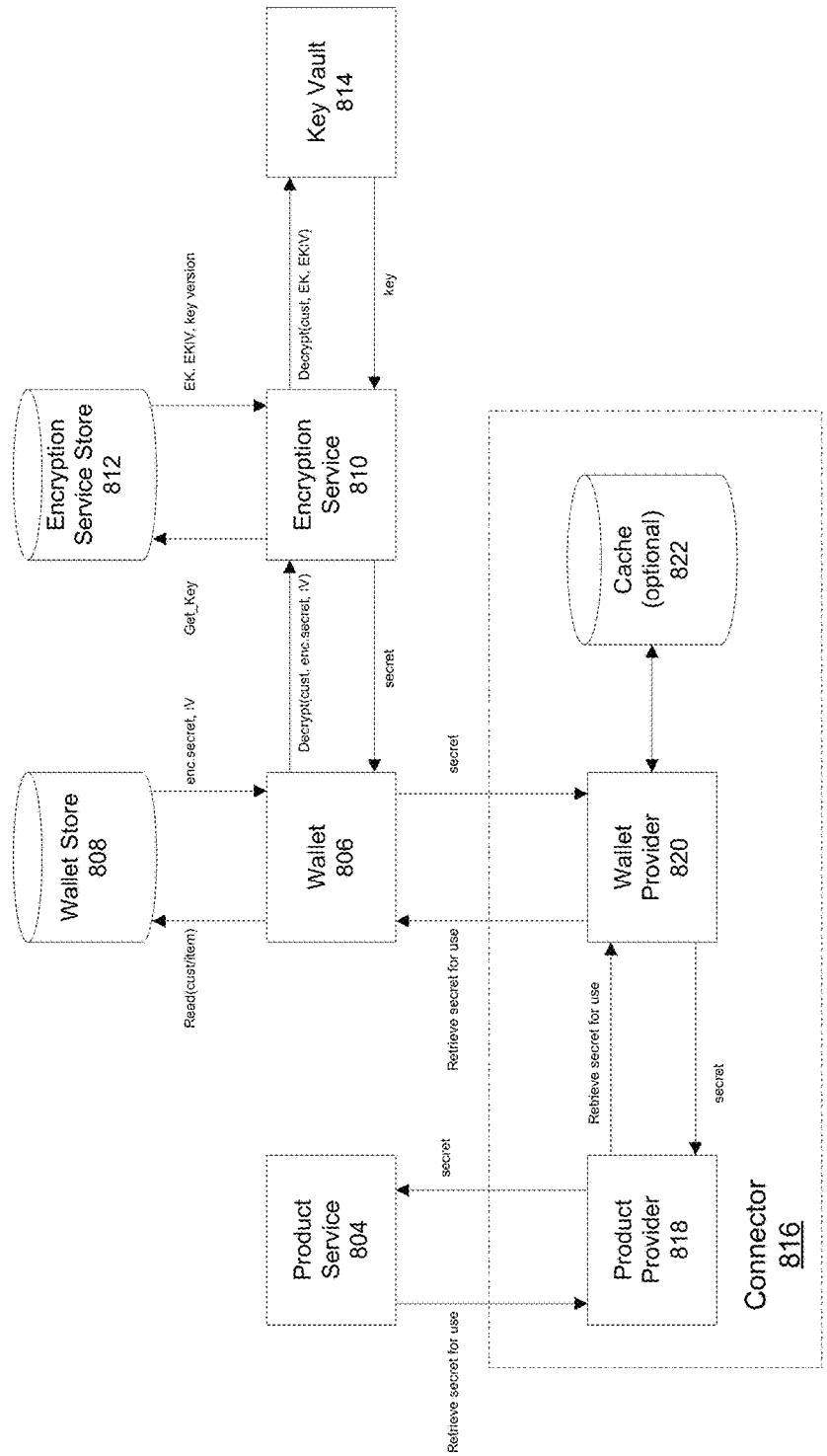
FIG. 8A is a block diagram illustrating a system that retrieves stored secret information in accordance with one or more illustrative aspects described herein.

FIG. 8A illustrates an example of a system 800 that may be used to retrieve a securely stored, according to various embodiments. As with system 700, system 800 is similar to systems 500 and 600 described above, except it also includes a connector element 816 (similar to connector element 716 described above) that acts as an intermediary between a customer and the cloud services.

As shown in FIG. 8A, a product service 804 that needs to access a secret may send a message to connector 816 via the product provider 818. The product provider 818 in turn calls or sends a message to the wallet provider 820 requesting the secret be made available. This request is then subsequently forwarded to wallet 806.

Upon receiving a request for the secret, the wallet 806 may send a read request to the associated wallet store 808 for the secret specified by the product service 804. The wallet store 808 can then return the associated encrypted version of the secret along with an associated IV to the wallet 806. Furthermore, according to various embodiments, the information contained in the decryption request may be temporarily encrypted for transmission using a pre-shared key.

After receiving the encrypted secret and associated IV from the wallet store 808, the wallet 806 may then send a decryption request to the encryption service 810. According to various embodiments, the decryption request may include information specifying the customer as well as copies of the encrypted secret and its associated IV.

Upon receipt of the decryption request, the encryption service 810 may (if necessary) decrypt the temporarily encrypted information. Additionally, the encryption service 810 may request a stored encrypted key (EK) from an associated encryption service store 812. In response to the request for the EK, the encryption service store 812 may return the EK and, in some embodiments, also return an encrypted key initialization vector (EKIV) as well as a key version associated with the key to the encryption service 810.

After receiving the EK (and possibly the EKIV and key version depending on the embodiment) from the encryption service store 812, the encryption service 810 may send a request to the key vault 814 requesting decryption of the EK. The request sent to the key vault 814 may or may not be temporarily encrypted for transmission according to the various embodiments and may include, among other things, information specifying a customer, a version of the key, the EK, and the EKIV.

The key vault 814 may decrypt the EK and return the decrypted key to the encryption service 810. Again, the key may be temporarily encrypted for transmission to the encryption service 810 using a pre-shared key according to various embodiments. When the encryption service 810 receives the key from the key vault 814 it may (if necessary) decrypt the key from its temporary encryption and then use the key to decrypt the secret. According to some embodiments, the encryption service 810 may, upon decrypting the secret, immediately delete the key from its memory. However, in some embodiments, the encryption service 810 may delete the key after a pre-determined amount of time regardless of whether it has actually been used to decrypt a secret. The secret can then be transmitted from the encryption service 810 to the wallet 806, which can itself transmit the secret to the connector 816. After the decrypted secret is transmitted to the connector 716, the protections placed on the secret by the connector (e.g., password protection, encryption, or the like) can be removed and the unadulterated secret can be returned to the product service 804 for its use. According to some embodiment, the secret can be temporarily encrypted during each stage of its transmission using one or more pre-shared keys to ensure security during transmission.

Figure 8B:
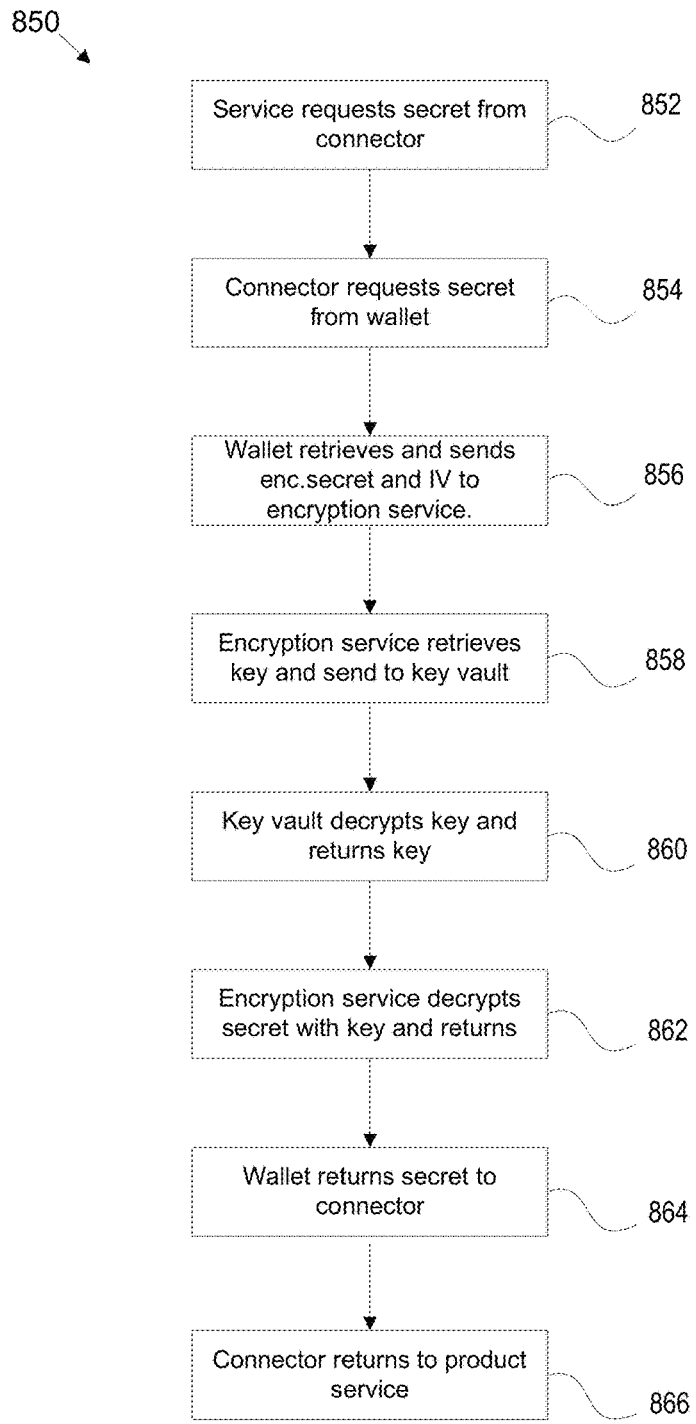
FIG. 8B is a flowchart illustrating a method of retrieving secret information in accordance with one or more illustrative aspects described herein.

FIG. 8B is a flowchart illustrating a method of retrieving a securely stored secret according to various embodiments. For ease of understanding, method 850 will be described with respect to the system 800 depicted in FIG. 8A. However, method 850 need not be limited to the specific system 800.

As shown in FIG. 8B, method 850 begins at 852 when a service (e.g., product service 804) requests a secret from connector (e.g., connector 816). As discussed above, internally within connector 816, product service 804 that needs to access a secret may send a message to connector 816 via the product provider 818. The product provider 818 may, in turn, call or send a message to the wallet provider 820 requesting the secret be made available. This request is then subsequently forwarded to wallet 806 at 854.

Upon receiving the request from connector 716 at 854, the wallet 806 may retrieve the encrypted secret (and an associated IV) from an associated wallet store (e.g., wallet store 808) and forward a request for decryption to an encryption service (e.g., encryption service 810) and 856. The request may include, among other things, information identifying the customer, the encrypted secret, and the associated IV, to name a few non-limiting examples. Additionally, in some embodiments, the information contained in the request may be temporarily encrypted for transmission using a pre-shared key.

Upon receiving the request, at 858, the encryption service 810 retrieves an encrypted key (EK) and (in some embodiments) an associated EKIV and key version and sends them to a key vault (e.g., key vault 814) for decryption. At 660, the key vault 814 returns the decrypted key to the encryption service 810. In some embodiments, the key may be temporarily encrypted for transmission rom the key vault 814 to the encryption service 810.

At 862, the encryption service 810 can use the key to decrypt the encrypted secret and transmit the decrypted secret to the wallet 806. Optionally, as discussed above, the encryption service 810 may, upon decrypting the secret, immediately delete the key from its memory. However, in some embodiments, the encryption service 810 may delete the key after a pre-determined amount of time regardless of whether it has actually been used to decrypt a secret. At 864, the wallet may forward the decrypted secret to the connector 816. At this point, if the secret is protected by connector encryption (as described above) or password protected, the connector may remove the protection. At 866, the connector 816 may forward an unadulterated version of the secret to the product service 804 for its use.

Figure 9A:
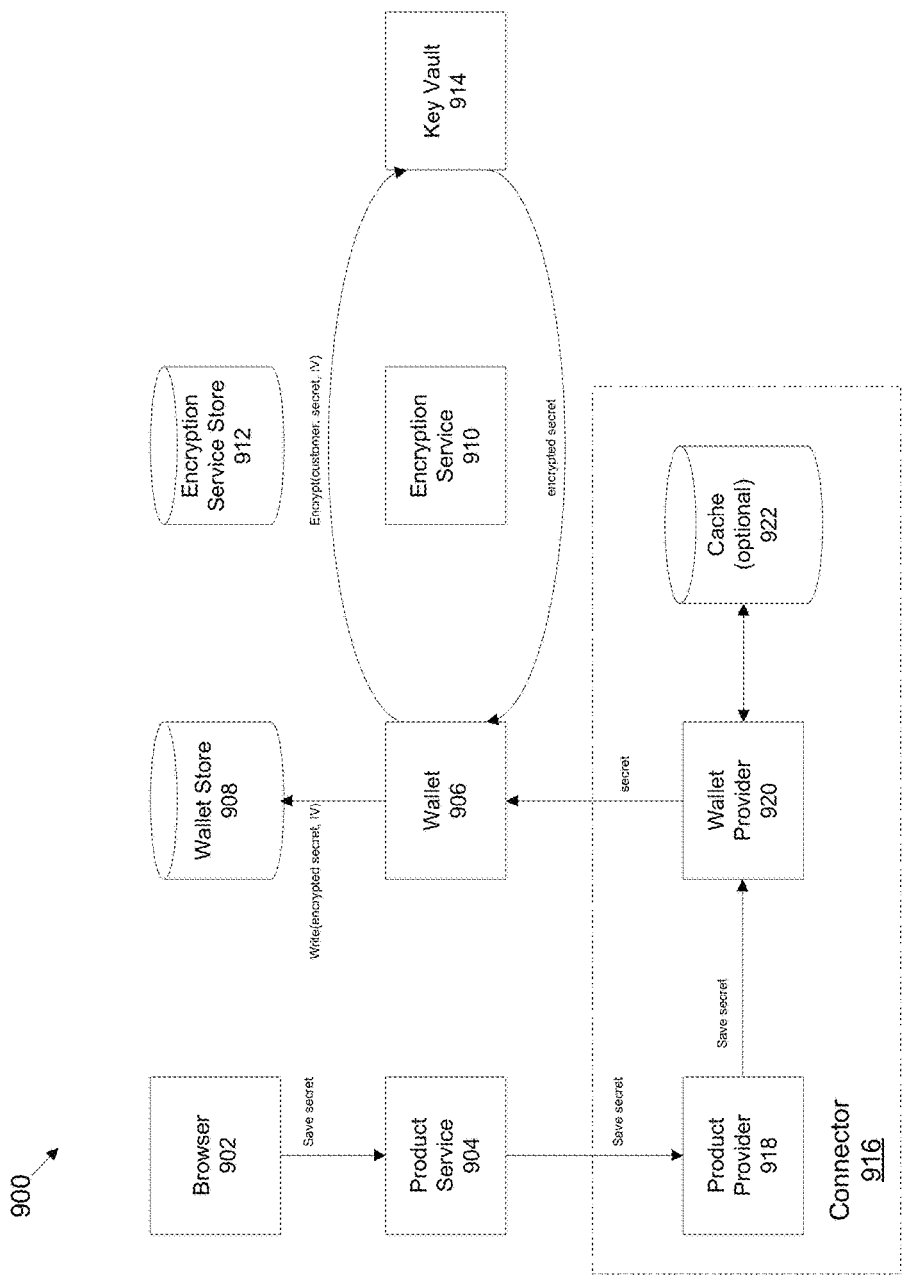
FIG. 9A is a block diagram illustrating a system that stores secret information in accordance with one or more illustrative aspects described herein.

FIG. 9A is a block diagram depicting a system 900 that can be used to securely store secrets according to embodiments of the disclosure. While FIG. 9A depicts a system 900 that is similar to systems 700 and 800 (i.e., it has a connector 916) the particular embodiments disclosed in FIG. 9A could also be implemented using systems similar to systems 500 and 600.

In system 900, the wallet 906 is configured to determine whether to bypass the use of the encryption service 910 in certain instances. For instance, in some application—namely those where a secret is below a certain threshold size (e.g., a few kilobytes)—it may be advantageous in terms of system latency to bypass the encryption service entirely and, instead, encrypt the secret directly with the key vault 914. When the wallet 906 determines that a secret satisfies the criteria for bypassing the encryption service 910, it can then send an encryption request directly to key vault 914, as shown in FIG. 9A. The encryption request to the key vault 914 may include, among other things, the secret to be encrypted, information pertaining to the customer and the IV that has been generated as discussed above. The key vault 940 may, then, encrypt the secret and return the encrypted secret which can be stored in the wallet store 908 similarly to how was described with respect to the other embodiments.

Figure 9B:
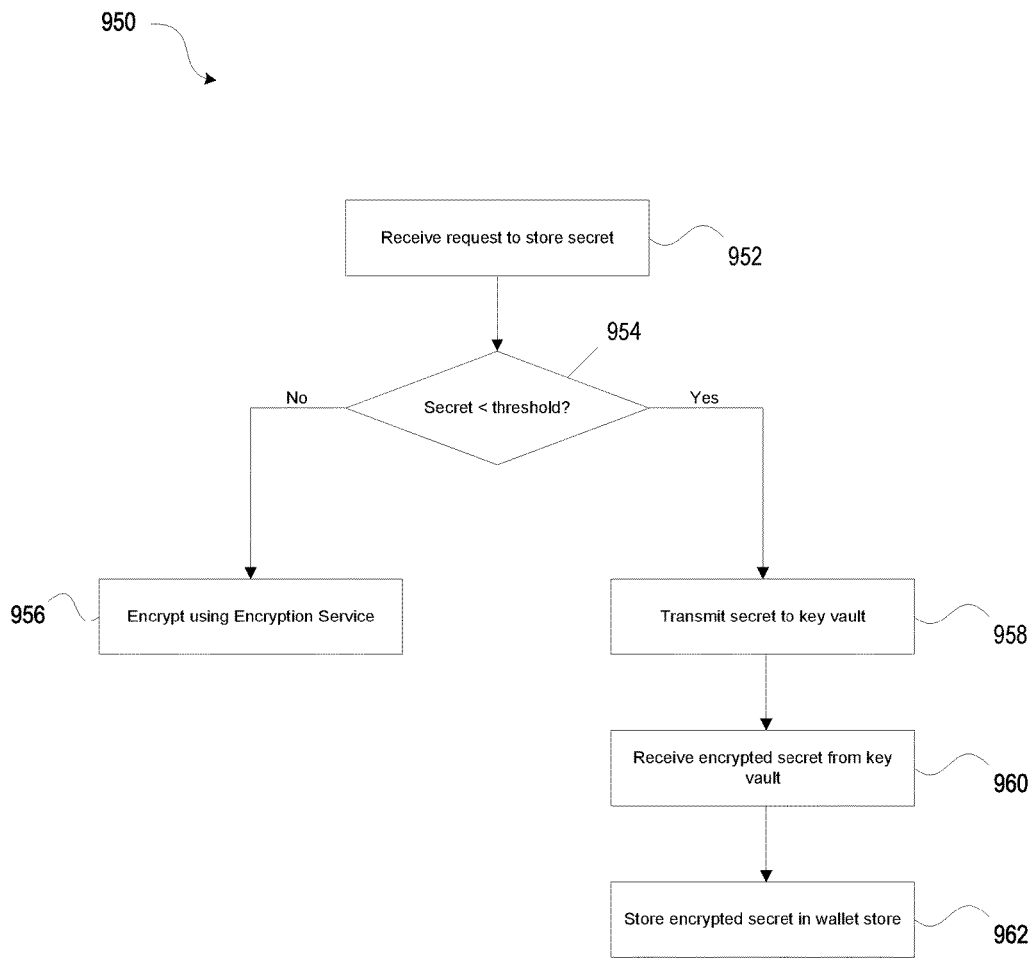
FIG. 9B is a flowchart illustrating a method of storing secret information in accordance with one or more illustrative aspects described herein.

FIG. 9B is a flow chart illustrating a method 950 for securely storing a secret according to various embodiments. For ease of understanding, method 950 will be described with respect to the system 900 depicted in FIG. 9A. However, method 950 need not be limited to the specific system 900.

As shown in FIG. 9B, the method 950 begins at 952 when the wallet 906 receives a request to securely store a secret. Depending on the particular embodiment, the request could come directly from a provider service (e.g., provider service 904) or via a connector (e.g., connector 916). At 954, the wallet 906 may determine whether the secret meets the requirements for encryption by bypassing the encryption service 910. According to various embodiments, to determine whether the secret meets the requirements for bypassing the encryption service, the wallet may consider a number of factors such as size of the secret, an urgency, system capacity, and available bandwidth, to name a few non-limiting examples. For instance, in some embodiments they wallet 906 may determine that every secret below a certain size (e.g., a few kilobytes) may meet the criteria for bypassing the encryption service 910. If, at 954, the wallet 906 determines that the secret does not meet the criteria for bypassing the encryption service 910, then the method 950 branches to 956 where the secret is encrypted using the encryption service 910 according to one or more of the method discussed above.

If at 954 the wallet 906 determines that the secret meets the criteria for bypassing the encryption service (e.g., that the secret is below a certain threshold in size), then the method 950 branches to 958. At 958, the wallet 906 may transmit a request for encryption directly to key vault 914. The request may include, among other things, the secret to be encrypted, information pertaining to the customer and the IV that has been generated as discussed above. The key vault may, then, encrypt the secret and, at 960, return the encrypted secret which can be stored in the wallet store 908 similarly to how was described with respect to the other embodiments at 962.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method of secure storage, comprising:
receiving a request to securely store data associated with a customer, the request comprising data to be stored;
generating an initialization vector to be used during encryption of the data to be stored;
transmitting the data to be stored and the initialization vector to an encryption service for encryption,
wherein the encryption service is configured to, based on receiving the data to be stored and the initialization vector, retrieve an encrypted private key from a first secure data store associated with the encryption service, and generate an encrypted version of the data to be stored using the initialization vector and a decrypted customer-specific key, and
wherein a remote key vault is configured to generate the decrypted customer-specific key by decrypting the retrieved encrypted private key based on a customer-specific partition of the remote key vault;
receiving information comprising the encrypted version of the data to be stored from the encryption service; and
storing the encrypted version of the data to be stored and the initialization vector in a second secure data store that is independent of the first secure data store.

2. The method of claim 1, wherein the initialization vector is randomly generated based on receiving the request to securely store the data.

3. The method of claim 1, further comprising:
temporarily encrypting the data to be stored using a pre-shared key and transmitting the temporarily encrypted data to be stored and the initialization vector to the encryption service, wherein the encryption service is further configured to decrypt the temporarily encrypted data to be stored using the pre-shared key.

4. The method of claim 3, wherein the pre-shared key comprises a public key.

5. The method of claim 1, wherein the method is further configured to:
generate temporarily encrypted data by encrypting the encrypted version of the data to be stored using a pre-shared key; and
generate the encrypted version of the data by decrypting the temporarily encrypted data using the pre-shared key.

6. The method of claim 1, further comprising:
determining, based on evaluating at least one of a plurality of criteria, whether to bypass the encryption service, wherein the plurality of criteria includes a size of the data to be stored, an urgency, a system capacity, and an available bandwidth; and
based on a determination to bypass the encryption service:
transmitting the data to be stored and the initialization vector to the remote key vault, wherein the remote key vault is configured to generate the encrypted version of the data using the initialization vector and based on the customer-specific partition of the remote key vault, and
receiving the encrypted version of the data to be stored from the remote key vault.

7. The method of claim 1, wherein the request further specifies the encrypted private key or the customer-specific partition of the remote key vault.

8. The method of claim 1, wherein the encryption service is further configured to delete the decrypted customer-specific key from memory of the encryption service based on at least one of:
generating the encrypted version of the data to be stored, or
a pre-determined amount of time elapsing after the decrypted customer-specific key is generated.

9. A method of secure storage, comprising:
receiving, from a product service, a request for securely stored data associated with a customer of the product service;
based on receiving the request, retrieving, from a first secure data store, an encrypted version of the data and an associated initialization vector;
transmitting the encrypted version of the data and the associated initialization vector to an encryption service for decryption,
wherein the encryption service is configured to, based on receiving the encrypted version of the data and the associated initialization vector, retrieve an encrypted private key from a second secure data store that is associated with the encryption service and is independent of the first secure data store, and generate a decrypted version of the data by decrypting the encrypted version of the data using the initialization vector and a decrypted customer specific key, and
wherein a remote key vault is configured to generate the decrypted customer-specific key by decrypting the retrieved encrypted private key based on a customer-specific partition of the remote key vault;
receiving information comprising the decrypted version of the data from the encryption service; and
providing, to the product service, the decrypted version of the data.

10. The method of claim 9, wherein providing the decrypted version of the data is provided to the product service via a connector component.

11. The method of claim 10, further comprising:
re-encrypting the decrypted version of the data using a pre-shared key associated with the connector component and providing the re-encrypted data to the connector component.

12. The method of claim 9, wherein the encryption service is further configured to re-encrypt the decrypted version of the data using a pre-shared key and the method further comprises:
receiving information comprising the re-encrypted data, and generating the decrypted version of the data by decrypting the re-encrypted data using the pre-shared key.

13. The method of claim 12, wherein the pre-shared key comprises a public key.

14. The method of claim 9, wherein the request for the stored data is received from the product service via a connector component.

15. The method of claim 9, further comprising:
deleting the information comprising the decrypted data from a local memory after transmitting the decrypted data to the product service.

16. The method of claim 9, further comprising:
authenticating the product service to verify that it has permission to access the stored data.

17. The method of claim 9, wherein the customer-specific partition is a link to a partition that is provided by the product service.

18. A system, comprising:
one or more processors; and
a memory storing computer-readable instructions that, when executed by the one or more processors, configure the one or more processors to:
receive, from a product service, a request for stored data, associated with a customer of the product service;
based on receiving the request, retrieve, from a first secure data store, an encrypted version of the data and an associated initialization vector;
transmit the encrypted version of the data and the associated initialization vector to an encryption service for decryption,
wherein the encryption service is configured to, based on receiving the encrypted version of the data and the associated initialization vector, provide an encrypted private key, and generate a decrypted version of the data by decrypting the encrypted version of the data using the initialization vector and a decrypted customer-specific key, and
wherein a remote key vault is configured to generate a decrypted customer-specific key by decrypting the encrypted private key based on a customer-specific partition of the remote key vault;
receive information comprising the decrypted version of the data from the encryption service; and
provide, to the product service, the decrypted version of the data, wherein the encryption service is further configured to store the encrypted private key in a second secure data store that is independent of the first secure data store.

* * * * *